United States Patent [19]

Carosino et al.

[11] Patent Number: 5,319,048
[45] Date of Patent: Jun. 7, 1994

[54] NON-CALORIC BULKING AGENTS FOR FOOD FOR REPLACEMENT OF SUGAR OR STARCH

[75] Inventors: Lawrence C. Carosino; Anthony B. Clayton, both of Wilmington, Del.

[73] Assignee: Hercules Incorporated, Wilmington, Del.

[21] Appl. No.: 814,529

[22] Filed: Dec. 30, 1991

[51] Int. Cl.⁵ .................... C07H 15/04; C08G 4/00
[52] U.S. Cl. .................... 527/300; 527/315; 526/238.23; 536/120
[58] Field of Search ............. 527/300, 315; 526/238, 526/23; 536/120

[56] References Cited

U.S. PATENT DOCUMENTS

| | | | |
|---|---|---|---|
| 3,766,165 | 10/1973 | Rennhard | 536/1.1 |
| 3,876,794 | 4/1975 | Rennhard | 426/548 |
| 4,535,152 | 8/1985 | Szejtli et al. | 527/300 |
| 4,585,858 | 4/1986 | Molotsky | 536/102 |

FOREIGN PATENT DOCUMENTS 0404227 12/1990 European Pat. Off. .

*Primary Examiner*—Nathan M. Nutter
*Attorney, Agent, or Firm*—David Edwards; Roy V. Jackson

[57] ABSTRACT

A new composition of matter that can be substituted as a bulking agent for sugar or starch to reduce the caloric content of foods comprising the polymeric product of the reaction of a water-soluble polyol with a di- or tri-epoxide, in water containing a water-soluble inorganic base that serves as a catalyst, and the process for making it.

14 Claims, No Drawings

NON-CALORIC BULKING AGENTS FOR FOOD FOR REPLACEMENT OF SUGAR OR STARCH

This invention relates to a replacement material or bulking agent that can be substituted for sugar or starch to reduce the caloric content of foods.

BACKGROUND OF THE INVENTION

A significant reduction in the caloric content of foods can be accomplished by removing the main source of the calories, which may be sugar, starch, or fat. However, when the calorie source is removed, it must be replaced with something that restores the food to its original appearance, texture, taste, consistency, and subjective feel in the mouth. In the case of sugar and starch, such a replacement material is frequently called a bulking agent.

For sugar replacement, the bulking agent should resemble sugar as closely as possible; it should be white, water-soluble, and solid; have a low caloric content, be odorless and either tasteless or sweet, and have no physiological effects. A lack of sweetness can be remedied with an appropriate amount of an artificial, calorie-free sweetener.

U.S. Pat. Nos. 3,766,165 and 3,876,794 disclose bulking agents made from monosaccharides such as glucose and maltose (reducing sugars) by heating them in the presence of edible polycarboxylic acid catalysts to form soluble or insoluble polyglucoses and polymaltoses having average molecular weights in the range of 1500 to 36,000. Melt-polymerization processes are used, and the use of alkali or alkaline earth carbonates to neutralize excess acidity in the products is disclosed.

European patent application EP 0 404 227 A2, published Jun. 13, 1990, describes a low-calorie bulking agent that is made by reacting together a monosaccharide such as glucose or maltose, a polyol such as glycerol or sorbitol, and a polycarboxylic acid that also acts as a catalyst, at elevated temperatures and pressures. The saccharides disclosed are reducing sugars. The product is intended to be added to puddings, cakes and other foods.

It is known that poorly digestible, water-soluble solids of low molecular weight, such as sorbitol (182.2), xylitol (152.1), and mannitol (182.2) give rise to osmotic diarrhea (the latter being known as a laxative), for instance from Lineback and Inglett, *Food Carbohydrates*, AVI Publishing, Westport CT., (1982) pg. 51, and that the effect is dependent on the molecular weight of the non digested quantity of the material. Thus, the bulking agent should also be polymeric.

There is a need for water-soluble polymers, made from inexpensive starting materials, which meet the above criteria. In addition to being replacements for sugar in foods, they may also find applications more traditionally associated with water-soluble polymers such as thickening agents, encapsulants, etc.

SUMMARY OF THE INVENTION

This invention provides non-caloric polymeric bulking agents for food by the reaction of water-soluble polyols, such as sorbitol or sucrose, with di- or tri-epoxides to form polymers. The polyols are hydrophilic and the epoxides are hydrophobic and there are no good solvents common to both, but surprisingly, sufficient contact between them for reaction to take place occurs in 10-30% water by weight, based on the polyol, containing about 1 to 2% of a water-soluble inorganic base such as calcium hydroxide as a catalyst for the reaction. Although it would be expected that the epoxide would be preferentially hydrolyzed by the water, in fact, the reaction according to the invention does take place instead.

The catalyst can be almost any water-soluble inorganic base such as sodium, potassium or calcium hydroxide or carbonate. $Ca(OH)_2$ is preferred because it gives a lighter-colored product than the others.

The suitable polyols have good water solubility at 100° C. and include erythritol, sorbitol, mannitol, and xylitol, and non-reducing sugars such as sucrose and trehalose. Sucrose is preferred. Reducing sugars, having a free aldoketone group, are not desirable because they produce dark colored, multicomponent mixtures.

The polymers according to the invention may be represented by the formula:

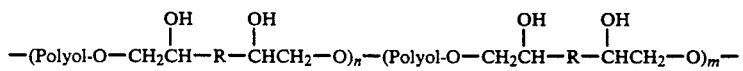

in which n and m are 0 to 1 with the proviso that the total of n plus m equals 1 and R is selected from the group consisting of a direct carbon-to-carbon bond, alkylene, $-CH_2O-R'-O-CH_2-$ in which R' is selected from alkylene, dialkyloxy, dialkylcyclohexyl, and a group having the general formula:

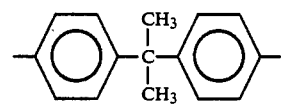

They are light-colored, water-soluble solids that have a low caloric content and are odorless and substantially tasteless. They have no physiological effects and may be successfully used to replace sugar in foods.

DETAILED DESCRIPTION OF THE INVENTION

In the reaction according to the invention, the weight ratio of water to polyol or sugar should be about 5 to 95 to 50 to 50 and preferably about 10 to 90 to 30 to 70. Below 10% of water most of the polyol or sugar does not dissolve, the reaction mixture is very difficult to stir and little or no reaction takes place. Above about 30% the reaction rate is slower, permitting too much hydrolysis of the epoxide to occur.

The epoxides can be represented by the formula:

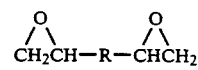

where R is a direct carbon-to-carbon bond or alkylene and

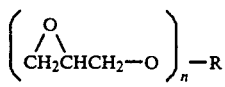

in which n=2 or 3 and R is a di- or trivalent radical consisting of linear or branched alkylene, di- or polyalkyloxy, alkylcycloalkyl and aromatic, including

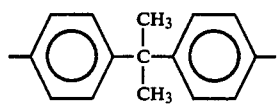

Thus, for example, the diepoxides may be glycidyl ethers of di-, tri- or polyethylene glycol, propylene glycol, ethylene glycol, 1,4 -butanediol, 1,4 -cyclohexanedimethanol or bisphenol A. The triepoxides may be triglycidyl ethers of glycerol, trimethylol propane or trimethylol ethane. Monoepoxides, such as butyl or isopropyl glycidyl ethers can be used in conjunction with the di- or tri-epoxide to modify the molecular weight.

The reaction rate varies depending on the particular combination of polyol or sugars and epoxide used but the reaction time is in the range of 1–4 hours at 110–115° C.

The polymer produced can be represented by the general formula

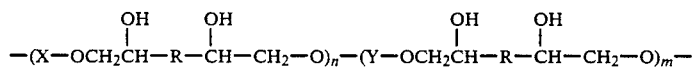

in which n and m are integers, X and Y are polyols or sugars and are the same or different and each R can be the same or different and is selected from the group consisting of a chemical bond, alkylene, —CH$_2$O—R'—O—CH$_2$— in which R' is selected from alkylene, dialkyloxy, dialkylcyclohexyl, and a compound having the general formula:

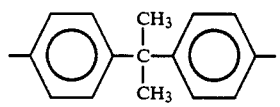

The reaction according to the invention is preferably carried out as follows: The catalyst, preferably 1 to 2% of total solids, is dissolved in water and added to the polyol, preferably sucrose, to give a 70 to 90% concentration of polyol to water preferably 80–85% concentration. The mixture is heated to 100–110°, the epoxide is added, and the mixture refluxed at 110–115° C. with stirring for 1 to 4 hours. Water is added to the reaction while it is still hot to give about a 50% solution, it is cooled to room temperature, transferred to a rotary evaporator and evaporated to dryness under reduced pressure at 70–80° C. to give the product.

After removing water, the product is a light-colored, water-soluble solid with a molecular weight generally ranging from about 1,000 to 200,000 and exceptionally up to about 1,000,000, and normally consisting of an envelope of differing molecular weights. A lower molecular weight fraction may act as a plasticizer for the polymer, thus reducing its utility, and if desired it can be removed by membrane ultrafiltration to give products with higher glass transition temperature (Tg).

The polymers according to the invention, of which the sucrose polyethers are preferred, can be substituted for all or part of the sugar or starch in most foods in which sugar or starch is customarily used, such as baked goods, candies, jams and jellies, and frozen desserts.

EXAMPLE 1

A solution of calcium hydroxide (6.5 parts) in water (130 parts) was added to sucrose (342 parts) and the mixture was stirred and heated to 100° C. 1,4 -butanediol diglycidyl ether (304 parts) was added and the mixture was stirred and refluxed at 115° C. for 2 hours. Water (150 parts) was added and the solution was cooled to room temperature and extracted three times with ethyl acetate (100 parts). Isopropanol was added to the solution to precipitate the polymer and the isopropanol/water mixture was decanted off and the residual isopropanol/water was removed under vacuum at 50° C. to give the dried polymer. Its molecular weight envelope ranged up to about 140,000 (by SEC) and its glass transition temperature was 21.8° C.

EXAMPLE 2

The reaction was run as above with a reflux time of 2.5 hour using 6.63 parts Ca(OH)$_2$, 132.6 parts water, 342 parts sucrose and 321.1 parts glycerol triglycidyl ether and gave a polymer with a molecular weight envelope up to about 150,000 and a Tg of 24.5° C.

EXAMPLE 3

The reaction was run as in Example 1 with a reflux time of 1.5 hours using 5.5 parts Ca(OH)$_2$, 82.6 parts water, 342 parts sucrose and 260 parts ethylene glycol diglycidyl ether and gave a product with a molecular weight envelope to about 1,000,000 and a Tg of 35.7° C.

EXAMPLE 4

The reaction was run as in Example 1 using 0.96 parts Ca(OH)$_2$, 14.6 parts water, 45.44 parts sorbitol and 52.26 parts ethylene glycol diglycidyl ether and gave a product with a molecular weight profile similar to that of the product of Example 3 with a molecular weight envelope to about 1,000,000. The Tg was −15.6° C.

EXAMPLE 5

A solution of calcium hydroxide (1.4 parts) in water (18.06 parts) was added to sucrose (68.4 parts) and the mixture was stirred and heated to 110° C. A mixture of ethylene glycol diglycidyl ether (41.6 parts) and butyl glycidyl ether (11.6 parts) was added in three hourly increments and the reaction was refluxed for a further hour after the final addition. An additional 150 parts of water was added and the resulting solution was cooled to room temperature, removed from the reactor and evaporated to dryness under reduced pressure. The resulting polymer had a lower molecular weight than that of Example 3 by size exclusion chromatographic analysis.

EXAMPLE 6

Example 5 was repeated using sodium carbonate instead of calcium hydroxide. The polymer obtained was identical to that of Example 5 except that it was darker.

EXAMPLE 7

Example 5 was repeated using potassium carbonate instead of calcium hydroxide. The polymer obtained was identical to that of Example 5 except that it was darker.

EXAMPLE 8

The reaction was run as in Example 5 using 24.8 parts ethylene glycol diglycidyl ether and 21.6 parts neopentyl glycol diglycidyl ether instead of butyl glycidyl ether which were added all at once instead of in increments. The polymer obtained had a molecular weight ranging up to about 85,000 and a Tg of 41.8° C.

EXAMPLE 9

The reaction was run as in Example 8 using 8.16 parts $(Ca(OH)_2$, 122.4 parts water, 410 parts sucrose, 219.2 parts ethylene glycol diglycidyl ether and 187.9 parts bisphenol A diglycidyl ether. The polymer obtained was dissolved in water and separated by membrane ultra filtration using a 10K dalton membrane. The water was removed from the retentate by vacuum distillation and vacuum oven drying and the polymer was ground to a fine particle size.

The molecular weight ranged from about 10,000 to about 100,000 and the Tg was 69° C.

EXAMPLE 10

The reaction was run as in Example 8 using 5.28 parts $Ca(OH)_2$, 68 parts water, 68 parts sucrose, 26.5 parts ethylene glycol diglycidyl ether and 30.3 parts 1,4-cyclohexanedimethanol diglycidyl ether. The polymer obtained had a Tg of 34.4° C. The same product made with 20% water had the same Tg but its molecular weight was higher and it contained less unreacted sucrose by SEC.

EXAMPLE 11

The reaction was run as in Example 8 using 21.12 parts $Ca(OH)_2$, 272 parts water, 1026 parts sucrose, 411.6 parts ethylene glycol diglycidyl ether and 424.9 parts 1,4-cyclohexanedimethanol diglycidyl ether. The polymer obtained was dissolved in water and separated by membrane ultrafiltration using a 5K dalton membrane. The water was removed from the retentate by vacuum distillation and vacuum oven drying and the polymer was ground to a fine particle size.

The molecular weight ranged from about 5,000 to about 100,000 and the Tg was 32.6° C.

EXAMPLE 12

Example 9 was repeated using 374.2 parts ethylene glycol diglycidyl ether and 386.3 parts 1,4-cyclohexanedimethanol diglycidyl ether.

The polymer obtained had a very similar molecular weight and a Tg of 44.6° C.

EXAMPLE 13

Hard Candy

A hard candy, incorporating the products of this invention as ingredients, was prepared using the following proportions of ingredients and the following directions:

| Ingredients | Grams |
| --- | --- |
| Corn Syrup - NETO 7300 | 190 |
| Sugar | 67 |
| Sucrose polyether (Example 9) | 67 |
| Water | 66 |

The sugar and sucrose polyether are dissolved in the water and 190 grams is poured into a 2 liter beaker. The corn syrup is added and the ingredients are mixed with a spatula for 3–4 minutes. The beaker is placed in a microwave oven and heated on high for 9 minutes when the temperature is 132° C. The mixture is poured onto a teflon sheet and allowed to cool.

The resulting candy was compared with a standard candy made from 190 grams corn syrup and 190 g sugar syrup 67 brix for weight gain. The standard candy gained 0.79% weight and the sucrose polyether candy gained 0.65% after two weeks under ambient conditions.

EXAMPLE 14

Rolled Sugar Cookies

Rolled sugar cookies, incorporating the products of this invention as ingredients, were made using the following proportions of ingredients and according to the following directions:

| Ingredients | Amount |
| --- | --- |
| All-purpose flour | 1 Cup |
| Baking powder | 1 tsp |
| Margarine | 3 tbsp |
| Shortening | 1/6 Cup |
| Sugar | 3/16 Cup |
| Sucrose polyether (Example 9) | 3/16 Cup |
| Egg | ½ |
| Milk | 2 tbsp |
| Vanilla | ½ tbsp |

The flour and baking powder are stirred together. The margarine and shortening are beaten for 30 seconds then the sugar and sucrose polyether are added and the mixture is beaten until fluffy. The egg, milk and vanilla are added and the mixture is beaten well then finally the flour and baking powder are added and the mixture is beaten until they are well combined. The mixture is covered and chilled for 3 hours.

The dough is rolled on a lightly floured surface to 1/8 inch thickness and cut into cookie shapes. The cookies are placed on an ungreased cookie sheet and baked at 375° F. (180.5° C.) for 8 to 8½ minutes.

The cookies have the appearance and texture of cookies prepared with a normal amount of sugar.

EXAMPLE 15

Brownies

Brownies, incorporating the products of this invention as ingredients, were prepared using the following proportions of ingredients and according to the following directions:

| Ingredients | Amount |
| --- | --- |
| Margarine | ¼ Cup |

| Ingredients | Amount |
| --- | --- |
| Sugar | ¼ Cup |
| Sucrose polyether (Example 10) | ¼ Cup |
| Vanilla extract | ½ tsp. |
| Egg | 1 |
| All-purpose flour | ¼ Cup |
| Cocoa | 1/6 Cup |
| Baking powder | ½ tsp |
| Salt | ½ tsp |

The melted butter, sugar, sucrose polyether and vanilla are blended in a large mixing bowl. The egg is added and the mixture is beaten well with a spoon. The flour, cocoa, baking powder and salt are combined and gradually blended into the mixture. The mixture is spread onto a greased pan and baked for 20–25 minutes at 350° F. (176.6° C.).

The brownies have the appearance and texture of brownies prepared with a normal amount of sugar.

EXAMPLE 16

Cupcakes

Cupcakes, incorporating the products of this invention as ingredients, were made using the following proportions of ingredients and according to the following directions:

| Ingredients | Amount |
| --- | --- |
| All-purpose flour | ⅔ Cup |
| Sucrose polyether (Example 10) | ½ Cup |
| Baking Powder | 1½ tsp |
| Salt | ½ tsp |
| Liquid Shortening | 8 tsp |
| Milk | ½ Cup |
| Vanilla | ½ tsp |
| Egg | 1 |

The ingredients are combined in a large mixing bowl and beaten on a low speed for 30 seconds then on a high speed for 3 minutes, scraping the bowl frequently.

The batter is poured into paper lined muffin cups until half full and baked for 30 minutes at 350° F.

The cupcakes have the appearance and texture of cupcakes prepared with a normal amount of sugar.

EXAMPLE 17

Frozen Dessert

Vanilla ice cream, incorporating the products of this invention as ingredients, was prepared using the following proportions of ingredients and according to the following directions:

| Ingredients | Amount |
| --- | --- |
| Whipping cream | 2 Cups |
| "Half and Half" | 2 Cups |
| Sugar | ½ Cup |
| Sucrose polyether (Example 10) | ½ Cup |
| Vanilla extract | 1 tbsp |

The sucrose polyether is dissolved in 1 Cup of the "half and half" (a commercial mixture of half cream and half milk) and the sugar and vanilla extract is dissolved in 1 Cup half and half. All the ingredients are combined and added to an Oster Ice Cream Maker and the machine is run for 15 minutes, then it is cooled with ice and salt and run for a further 19 minutes. The ice cream is removed and frozen.

The ice cream has the appearance and texture of frozen ice cream made with the normal amount of sugar.

We claim:

1. A composition of matter that can be substituted for sugar or starch to reduce the caloric content of foods comprising the polymeric product of the reaction of a water-soluble polyol that is hydrophilic with a di- or tri-epoxide that is hydrophobic, in 10–30% by weight based on the polyol of water containing a water-soluble inorganic base that serves as a catalyst.

2. A composition of matter as claimed in claim 1 in which the polyol is selected from the group consisting of erythritol, sorbitol, mannitol, xylitol, and non-reducing sugars selected from the group consisting of sucrose and trehalose.

3. A composition of matter as claimed in claim 1 in which the polyol is sucrose.

4. A composition of matter as claimed in claim 1 in which the catalyst is calcium hydroxide.

5. A composition of matter as claimed in claim 3 in which the catalyst is calcium hydroxide.

6. A composition of matter as claimed in claim 1 in which the epoxide has a formula selected from the group consisting of

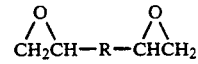

where R is a direct carbon to carbon bond or alkylene and

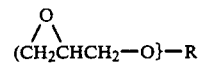

where n=2 or 3 and R is a di- or trivalent radical consisting of linear or branched alkylene, di- or polyalkyloxy, alkylcycloalkyl and aromatic having the formula

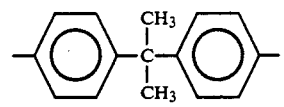

which structures are made by the reaction of epichlorohydrin with di- or tri-hydroxy compounds.

7. A composition of matter as claimed in claim 1 that has the formula

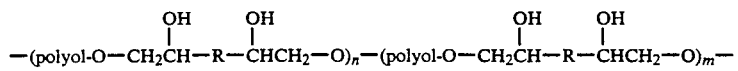

in which n and m are 0 to 1 with the proviso that the total of n plus m equal 1 and R is selected from the group consisting of a direct, carbon-to-carbon bond, alkylene, —CH₂O—R'—O—CH₂— in which R' is selected from alkylene, dialkyloxy, dialkylcyclohexyl, and a compound having the formula

8. A composition of matter as claimed in claim 6 that has the formula

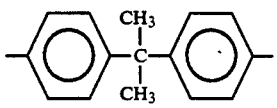

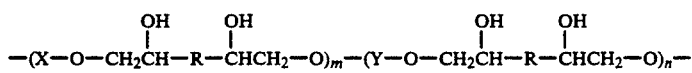

in which m and n are 0 to 1 with the proviso that the total of m plus n equal 1, X and Y are polyols and are the same or different and each R can be the same as the other or different and is selected from the group consisting of a chemical bond, alkylene, —CH$_2$O—R'—O—CH$_2$— in which R' is selected from alkylene, dialkyloxy, dialkylcyclohexyl, and a compound having the formula

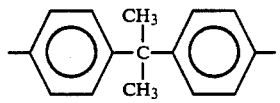

9. A composition of matter as claimed in claim 7 in which the polyols are sucrose.

10. A process for making a composition of matter that can be substituted for sugar or starch to reduce the caloric content of foods comprising
  a. dissolving a water-soluble inorganic base that serves as a catalyst in 10–30% by weight of water, based on polyol,
  b. adding a polyol to solution a,
  c. heating b to dissolve the polyol to form a solution of the polyol in water,
  d. adding a di- or tri- epoxide to c, and
  e. heating d to complete the reaction.

11. A process for making a composition of matter as claimed in claim 10 in which the polyol is selected from the group consisting of erythritol, sorbitol, mannitol, xylitol, and non-reducing sugars selected from the group consisting of sucrose and trehalose.

12. A process for making a composition of matter as claimed in claim 10 in which the polyol is sucrose.

13. A process for making a composition of matter as claimed in claim 10 in which the catalyst is calcium hydroxide.

14. A process for making a composition of matter as claimed in claim 10 in which the epoxide has a formula selected from the group consisting of:

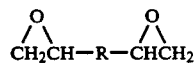

where R is a direct carbon-to-carbon bond or alkylene and

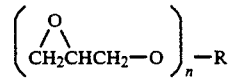

where n=2 or 3 and R is a di- or trivalent radical consisting of linear or branched alkylene, di- or polyalkyloxy, alkylcycloalkyl and aromatic, including compounds having the formula:

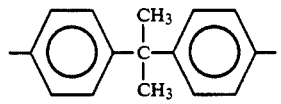

which structures are generally made by the reaction of epichlorohydrin with di- or tri-hydroxy compounds.

* * * * *